US007094971B2

(12) United States Patent
Johnsen

(10) Patent No.: US 7,094,971 B2
(45) Date of Patent: Aug. 22, 2006

(54) COAXIAL CABLE Y-SPLITTER ASSEMBLY AND METHOD

(75) Inventor: David J. Johnsen, New Hope, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/770,904

(22) Filed: Feb. 3, 2004

(65) Prior Publication Data

US 2004/0219832 A1 Nov. 4, 2004

Related U.S. Application Data

(60) Provisional application No. 60/454,950, filed on Mar. 12, 2003.

(51) Int. Cl.
*H02R 4/00* (2006.01)
*H02G 3/06* (2006.01)

(52) U.S. Cl. .................. 174/84 R; 174/88 C; 439/502; 439/638

(58) Field of Classification Search .............. 174/74 R, 174/75 C, 78, 81, 84 R, 88 C; 439/502, 439/578, 638
See application file for complete search history.

(56) References Cited

U.S. PATENT DOCUMENTS

| | | | | |
|---|---|---|---|---|
| 4,738,009 A | | 4/1988 | Down et al. | |
| 4,773,879 A | * | 9/1988 | Pauza | 439/579 |
| 5,030,122 A | * | 7/1991 | Birch et al. | 439/188 |
| 5,387,116 A | * | 2/1995 | Wang | 439/188 |
| 5,503,566 A | * | 4/1996 | Wang | 439/188 |
| 5,702,261 A | * | 12/1997 | Wang | 439/188 |
| 6,299,479 B1 | | 10/2001 | Tang | |

OTHER PUBLICATIONS

Trompeter Electronics, INC data sheet, Drawing No. 1-0468, Jan. 2003.*
Trompeter Electronics, INc data sheet, Drawing No. 105-1541, Mar. 1, 1994.*
Trompeter Electronics, INC data sheet, Drawing No. 1-0252, Dec. 11, 1989.*
Trompeter Electronics, INC data sheet, Drawing No. 105-0140, Jan. 22, 1992.*
Trompeter Electronics, INC data sheet, Drawing No. 01-0494, Mar. 27, 2001.*
Trompeter Electronics Inc., p. 14, undated, from a 1991 Product Catalog.*
Exhibits A and B, photographs of products manufactured by competitors.*
Copy of U.S. Appl. No. 10/809, 666, filed on Mar. 25, 2004.*
Trompeter Electronics Inc., p. 14, undated, from a 1991 Product Catalog.
Exhibits A and B, Photographs of products manufactured by competitors.
Copy of U.S. Patent Application Serial No. 10/809,666, filed on Mar. 25, 2004.

* cited by examiner

*Primary Examiner*—Wiliam H. Mayo, III
(74) *Attorney, Agent, or Firm*—Merchant & Gould P.C.

(57) ABSTRACT

A coaxial cable splitter including an integral body with a first cable connection, a second cable connection and a third cable connection, each defining an axis. The second cable connection is a crimp sleeve, the first cable connection is a coaxial connector, and the axes are generally parallel to each other. The third cable connection is a coaxial cable connector and the axis is at an angle to the axes of the first and second cable connections. The first and third cable connections each include a center conductor which are electrically linked. The first and third cable connections each include an outer shell positioned about the center conductor which are electrically linked. A method of assembling a coaxial cable splitter with an integral body.

17 Claims, 11 Drawing Sheets

COAXIAL CABLE Y-SPLITTER ASSEMBLY AND METHOD

This application claims the benefit of Provisional Application Ser. No. 60/454,950, filed Mar. 12, 2003, the disclosure of which is incorporated herein by reference.

FIELD OF THE INVENTION

The present invention generally relates to cables for use with telecommunications equipment. More specifically, the present invention relates to a coaxial cable Y-splitter.

BACKGROUND OF THE INVENTION

In telecommunications installations, it is known to have signal handling or processing equipment which has high availability requirements. Often, such equipment is installed in a paired or redundant arrangement. For example, the signal handling equipment might be in the form of a module configured to be mounted to a chassis. A redundant module may be mounted adjacent the first module. The redundant module may be connected to the first module so that the redundant module can carry out the signal handling or processing if the first module should fail. In this fashion, a failure or maintenance of the first module would not result in the loss of connectivity or failure or of transmission of the signals handled by the first module.

It is desirable to improve the cables which are used to connect these redundant signal processing or handling modules. These improved cables and cable assemblies may also be adaptable to other coaxial cable installations.

SUMMARY OF THE INVENTION

A coaxial cable splitter including an integral body with a first cable connection, a second cable connection and a third cable connection, each cable connection defining an axis. The second cable connection is a crimp sleeve, the first cable connection is a coaxial connector, and the axes of the first and second cable connectors are arranged generally parallel to each other. The third cable connection is a coaxial cable connector and the axis of the third cable connection is arranged at an angle to the axes of the first and second cable connections. The first and third cable connections each include a center conductor and the center conductors of the first and third cable connections are electrically linked. The first and third cable connections each include an outer shell positioned about the center conductor, the outer shell of the first cable connection electrically linked to the outer shell of the third cable connection.

A method of assembling a coaxial cable splitter including providing an integral housing with a first cable connection, a second cable connection and a third cable connection, each of the cable connections defining an axis. A first insulator is positioned within the first cable connection and includes a central opening oriented along the axis of the first cable connection. A first end of a center conductor is inserted within the central opening of the first insulator. The center conductor includes a second end which extends through the second cable connection along the axis of the second cable connection. A cable conductor is extended through the third cable connection and electrically linked with the center conductor. A hollow tubular outer shell is positioned about the second end of the center conductor, so that the tubular outer shell is oriented along the axis of the second cable connection. An insulator is inserted withint he tubular outer shell about the second end of the center conductor.

An alternative embodiment of a coaxial cable splitter including an integral body with a first cable connection, a second cable connection and a third cable connection, each cable connection defining an axis. The second cable connection is a crimp sleeve and the first cable connection is a coaxial connector, and the axes of the first and second cable connectors are arranged generally parallel to each other. The third cable connection is a coaxial cable connector and the axis of the third cable connection is arranged at an angle to the axes of the first and second cable connections. The first and third coaxial connections each include a center conductor and the center conductors of the first and third coaxial connections form an integral center conductor having an angled shape. The first and third coaxial connections each include an outer shell positioned about the center conductor. The outer shell of the first coaxial connection is electrically linked to the outer shell of the third coaxial connection. The integral center conductor is held within the housing by at a pair of insulators which electrically isolate the center conductor from the housing.

BRIEF DESCRIPTION OF THE DRAWINGS

The accompanying drawings, which are incorporated in and constitute a part of the description, illustrate several aspects of the invention and together with the description, serve to explain the principles of the invention. A brief description of the drawings is as follows.

DETAILED DESCRIPTION

Figure 1:
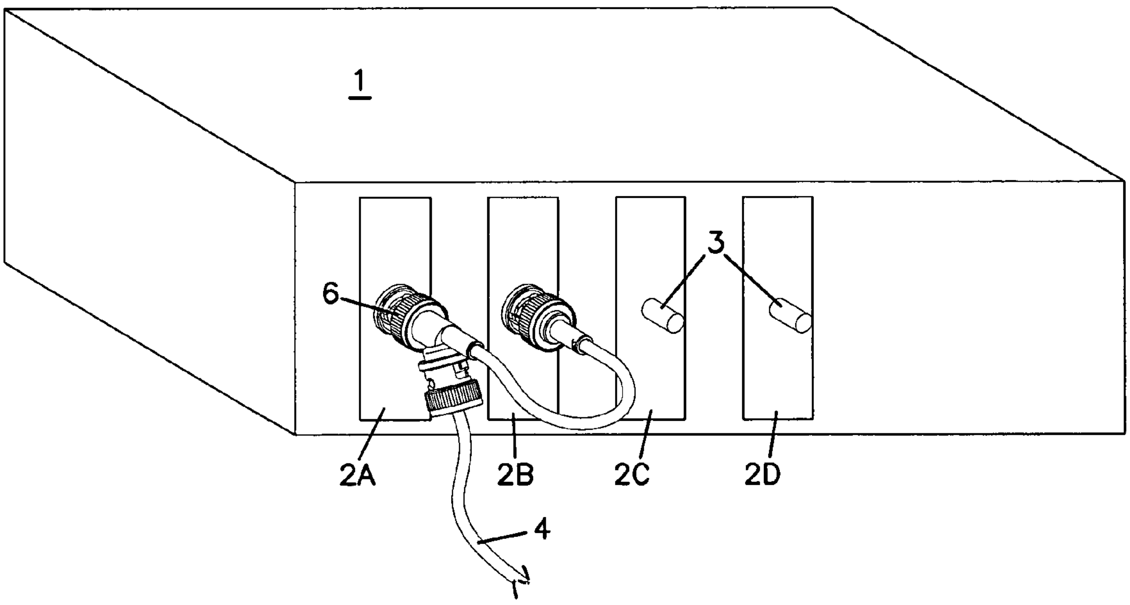
FIG. 1 is a perspective view of a telecommunications equipment chassis with a plurality of equipment modules mounted to the chassis, and a coaxial cable splitter in accordance with the present invention linking two of the equipment modules.
Figure 2:
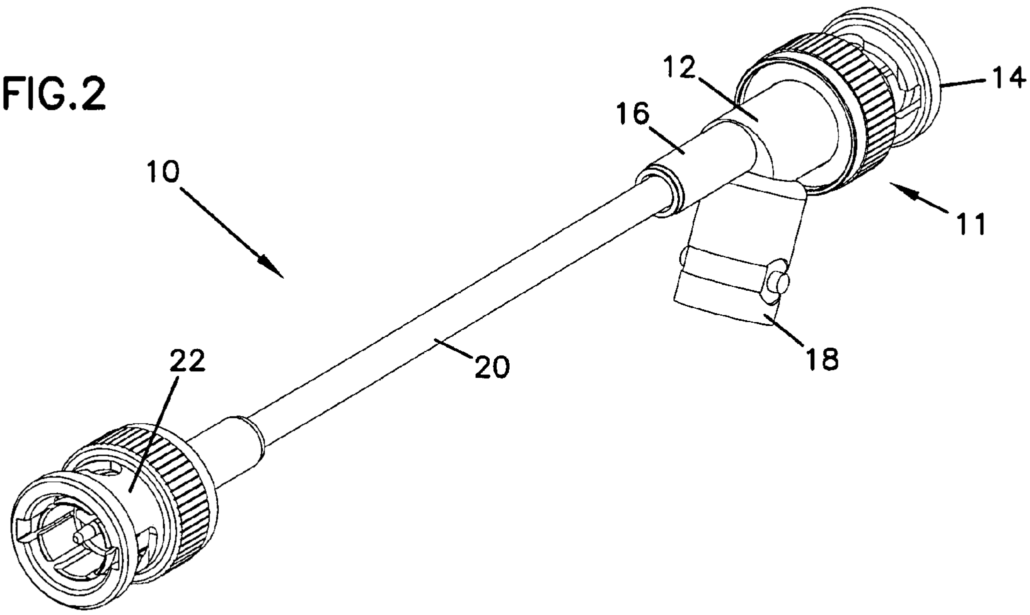
FIG. 2 is a first perspective view of the coaxial cable splitter in accordance with the present invention shown.
Figure 3:
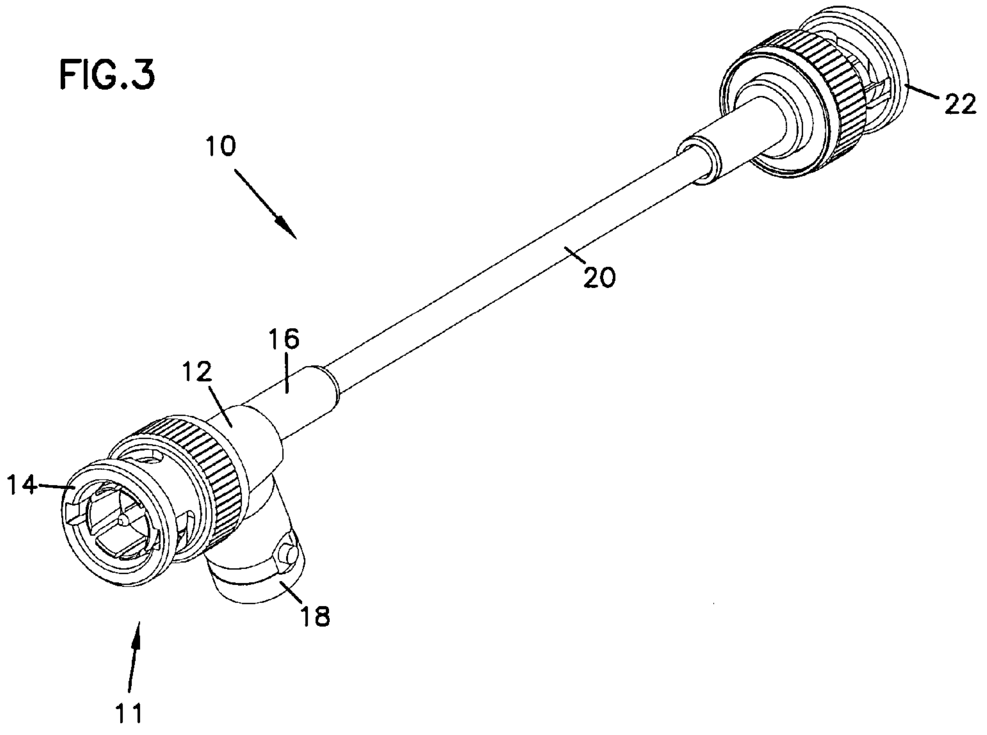
FIG. 3 is a second perspective view of the coaxial cable splitter of FIG. 2.
Figure 4:
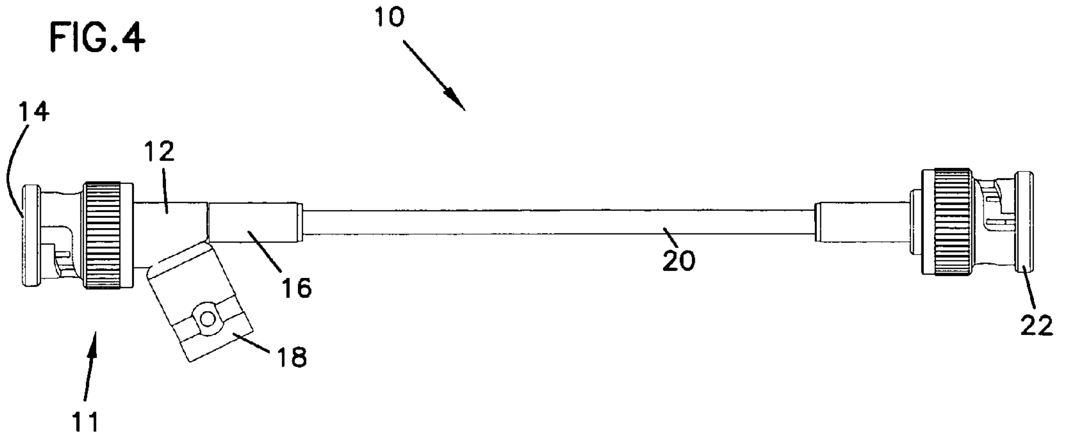
FIG. 4 is a side view of the coaxial cable splitter of FIG. 2.
Figure 5:
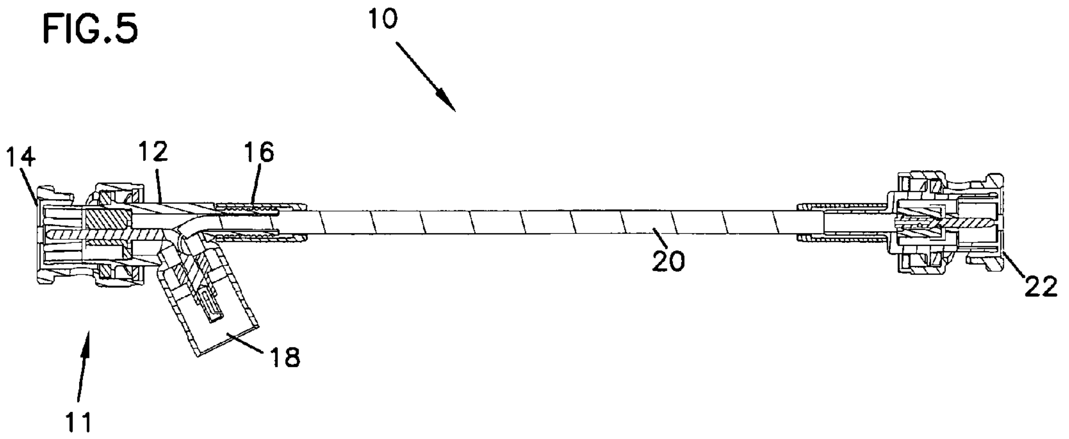
FIG. 5 is a side cross-sectional view of the coaxial cable splitter of FIG. 2, taken along the centerline of the coaxial cable.

In telecommunications equipment installations where a high degree of communications availability is required or desirable, it is known to install redundant or paired equipment for signal processing or switching. The redundancy permits failure of the primary piece of equipment without jeopardizing the passage of signals through the equipment. As shown in FIG. 1, a chassis 1 provides a location for mounting of equipment modules 2. A first pair of modules 2, labeled 2A and 2B, and a second pair of modules 2, labeled 2C and 2D, are the same type of equipment modules. Modules 2A and 2B and modules 2C and 2D, respectively, are mounted adjacent each other and each module 2 includes a coaxial cable jack connection 3.

Cable connections 3 of modules 2A and 2B, are linked to each other by a cable splitter 10. Cable splitter 10 connects both the cable connections 3 of modules 2A and 2B to each other and to another piece of telecommunications equipment by a cable 4. As shown in FIG. 1, both modules 2A and 2B are electronically linked to the downstream equipment at all times, as cable splitter 10 is a passive device without any switching circuitry. Module 2A is the primary piece of equipment in this pair of modules 2. If module 2A were to fail or need to be taken out of service for routine inspection, maintenance or repair, module 2B would still be connected to the other piece of telecommunications equipment by cable 4. Thus, failure, repair or maintenance of module 2A would not require taking the entire telecommunications circuit offline, which can be inconvenient and costly.

Referring now to FIGS. 2 through 5, cable splitter 10 includes a housing 12 with a first cable connection 14, a second cable connection 16 and a third cable connection 18. All three cable connections are part of a housing assembly 11. As shown, first cable connection 14 is a BNC plug connector, second cable connection 16 is a crimp connector and third cable connection 18 is a BNC jack connector. A first end of a coaxial cable 20 is electrically and physically connected to second cable connection 16, as will be discussed in further detail below. A second end of coaxial cable 20 is connected to a cable connector 22, which is a BNC plug connector. The length of coaxial cable 20 is sufficient so that first connection 14 can be connected to cable connection 3 of module 2A and connector 22 can be connected to cable connection 3 of module 2B, or between cable connections 3 of modules 2C and 2D.

While cable splitter 10 is shown with a pair of BNC plug connectors, cable connection 14 and cable connector 22, and a BNC jack connector, cable connection 18, other configurations are anticipated and are within the scope of the present invention. All three connections might be BNC jack or BNC plug connections. Further, difference combinations of BNC jack and plug connections may be used. Alternatively, other types, styles and formats of coaxial cable connectors may be used.

Figure 6:
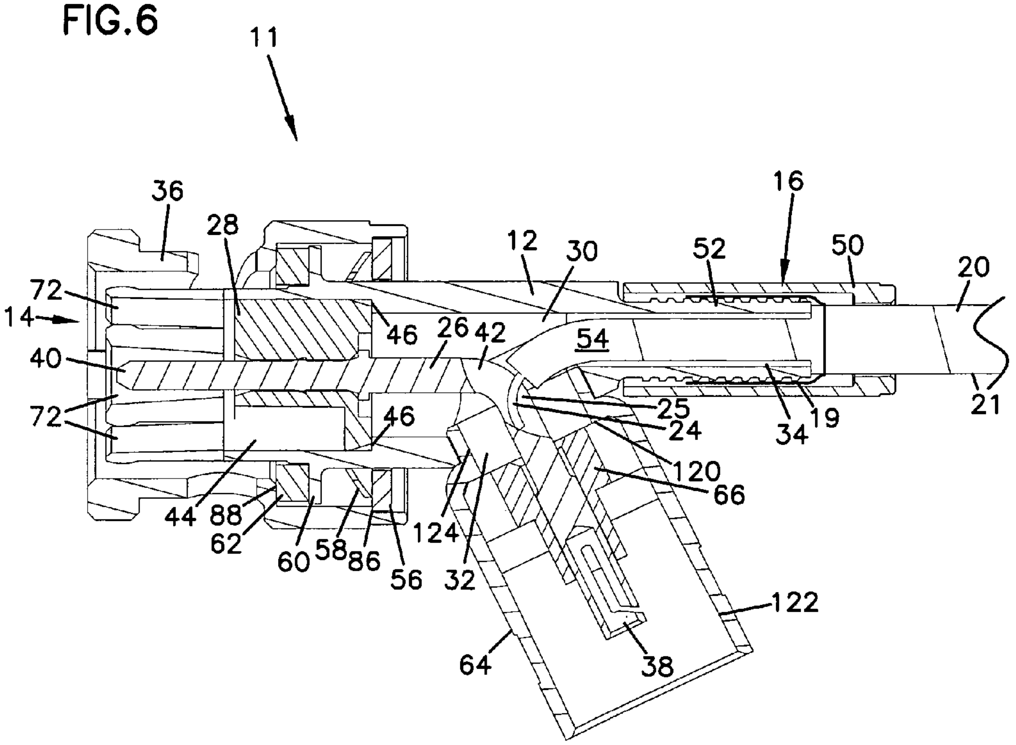
FIG. 6 is a side cross-sectional view of the housing assembly of the coaxial cable splitter of FIG. 5, with a portion of the jack cable connection removed for clarity.
Figure 7:
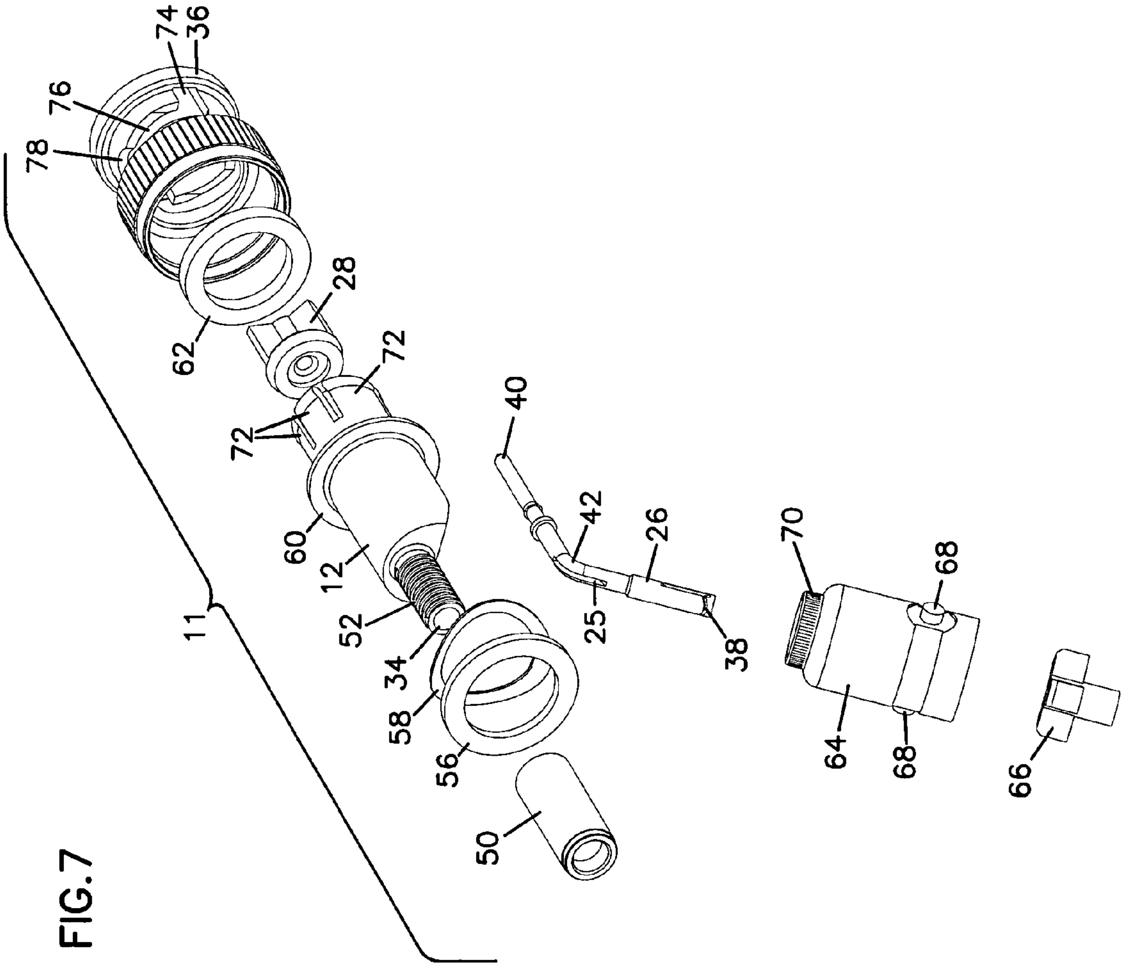
FIG. 7 is a first exploded perspective view of the housing assembly of the coaxial cable splitter of FIG. 2.
Figure 8:
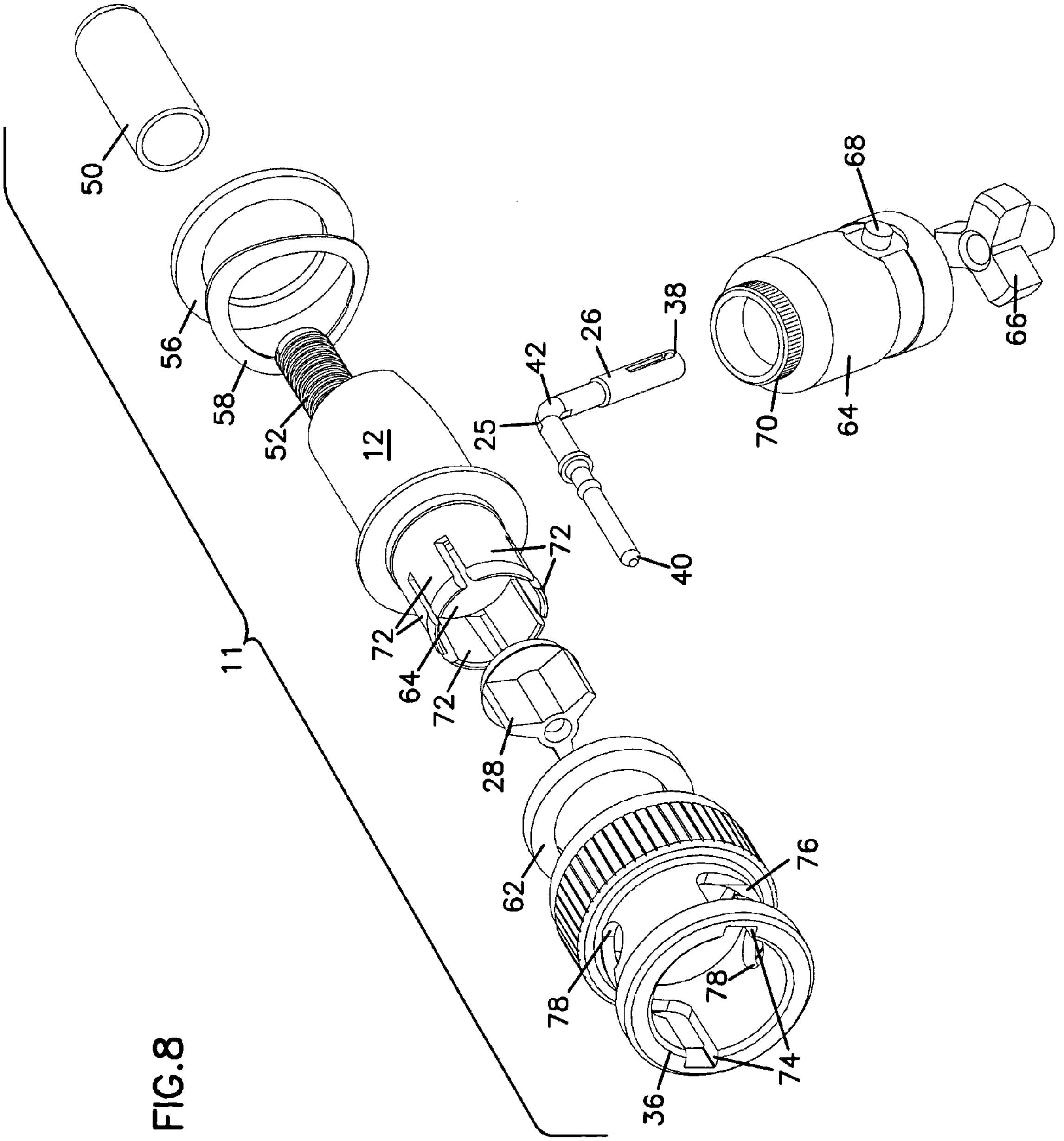
FIG. 8 is a second exploded perspective view of the housing assembly of FIG. 7.
Figure 9:
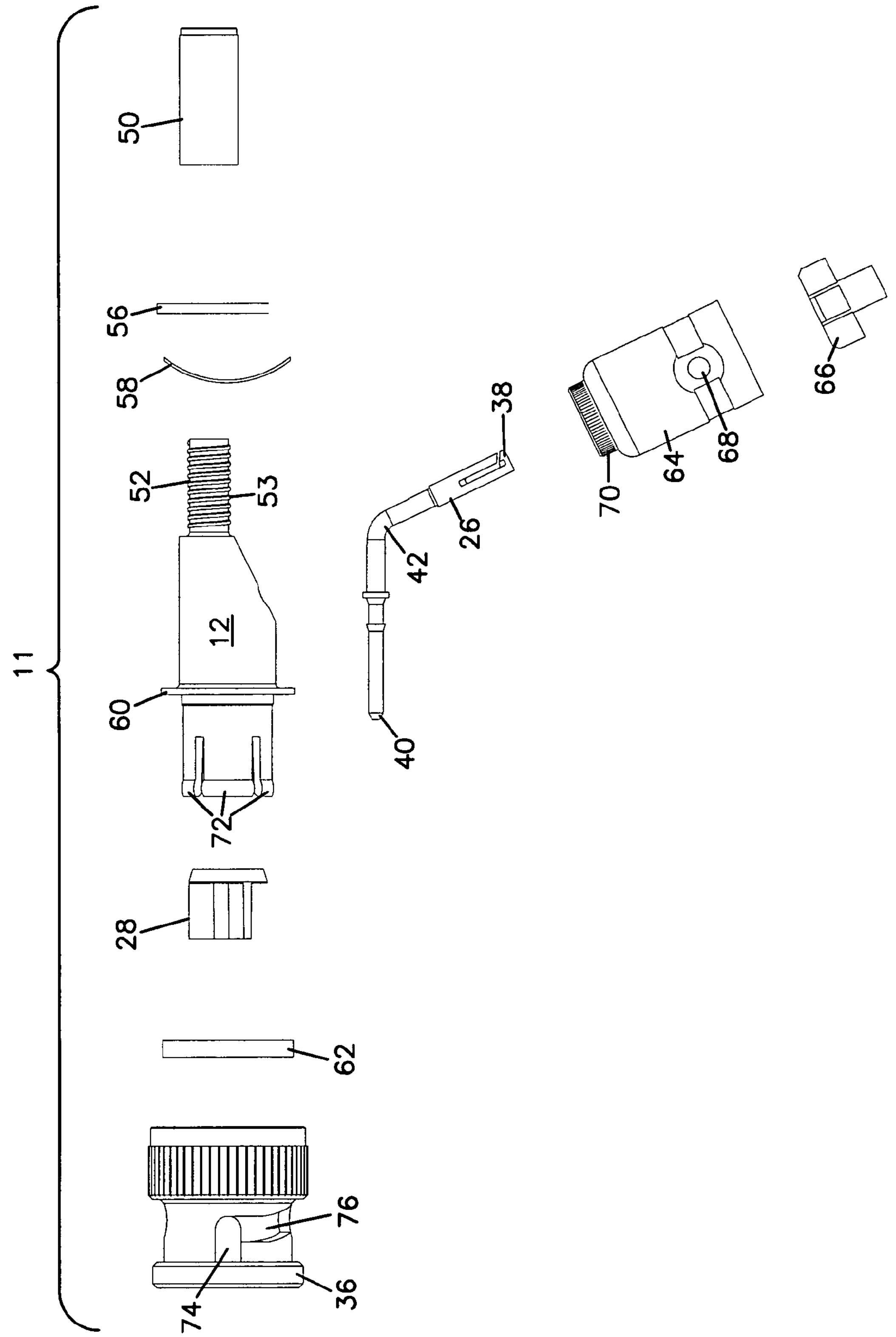
FIG. 9 is an exploded side view of the housing assembly of FIG. 7.
Figure 12:
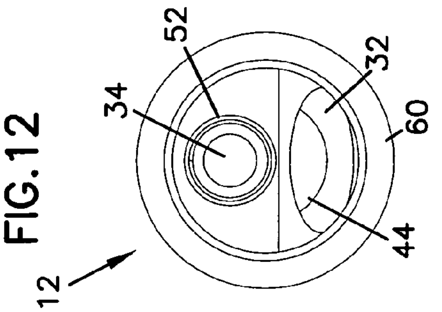
FIG. 12 is a second opposite end view of the housing of FIG. 10.
Figure 11:
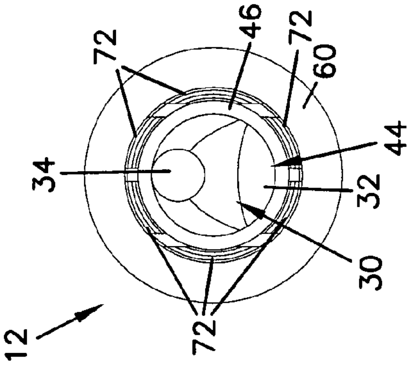
FIG. 11 is a first end view of the housing of FIG. 10.
Figure 10:
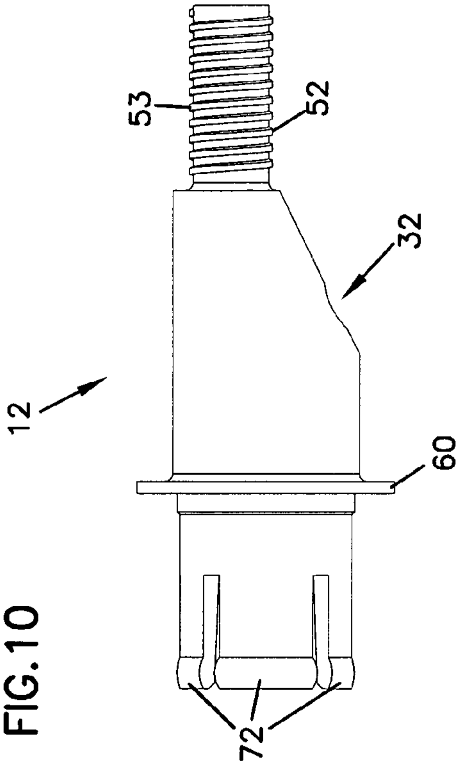
FIG. 10 is a side view of a housing of the housing assembly of the coaxial cable splitter of FIG. 2.

Referring now to FIG. 6, cable splitter 10 includes a center conductor 26 which extends between cable connections 14 and 18. Center conductor 26 includes an opening 25 which receives a center cable conductor 24 of cable 20 extending through connection 16. Cable center conductor 24 is physically and electrically connected to center conductor 26 and thus to cable connections 14 and 18. The connection can be crimped and/or soldered. Cable center conductor 24 is also electrically connected to connector 22, so that all three connectors at cable connections 14, 16, and 18 are electrically linked. Center conductor 26 is held within a central cavity 30 of housing 12 by a center conductor insulator 28. Insulator 28 holds center conductor 26 so that a plug end 40 extends within connection 14 and a jack end 38 extends within connection 18. Centrally located along center conductor 26 is an angled portion 42.

Central cavity 30 of housing 12 includes three openings, a first opening 44 associated with first connection 14, a second opening 34 associated with connection 16, and a third opening 32 associated with third connection 18. Within opening 44 is a ledge or shoulder 46 against which insulator 28 is positioned. Housing 12 generally defines a cylindrical shape and openings 44 and 34 generally extend parallel to each other and to housing 12. Opening 32 defines an axis 48 which extends at a non-perpendicular angle to the other two openings and to housing 12.

A locking barrel 36 is positioned about first cable connection 14. Barrel 36 is rotatable mounted about housing 12 and engages bayonets extending from a tubular outer shell of a mating jack connector. Barrel 36 allows connection 14 to be selectively fastened to a mating jack connector or released from such a mating connector by rotation of barrel 36.

Second cable connection 16 includes a crimp sleeve 50 and a crimp post 52. Crimp post 52 defines opening 34 of connection 16. When connecting a coaxial cable, such as cable 20, to connection 16, an inner insulation member 54 of cable 20, which is positioned about cable center conductor 24, is inserted through opening 34. Cable 20 also includes an outer shield conductor 19. Outer shield conductor 19 is positioned about crimp post 52. Crimp sleeve 50 is placed about the outer shield conductor 19 and compressed to mechanically lock cable 20 to housing 12 and to ensure electrical contact of outer shield conductor 19 and housing 12.

Housing 12 and the various elements mounted within and about housing 12 are shown in more detail in FIGS. 7 through 12. The exterior surface of crimp post 52 is shown with shallow threads 53 to aid in the mechanical connection between cable 20 and housing 12. Other similar outer surfaces may also be used, such as knurling or circumferential rings may be used to aid in the mechanical connection. Barrel 36 is mounted to housing 12 with a crimp ring 56 about which barrel 36 is compressed. Positioned between crimp ring 36 and an exterior barrel ledge 60 of housing 12 is a wave washer 58. Washer 58 is shaped to provide bias against longitudinal movement of barrel 36 and improve the locking provided by barrel 36 about a mating jack connection. A bearing washer 62 is positioned between barrel 36 and barrel ledge 60 opposite wave washer 58.

A tubular outer shell 64 is inserted within opening 32 and forms part of third connection 18. A mating portion 70 of shell 64 is sized to be received within opening 32 in an interference fit. Jack end 38 of center conductor 26 extends within shell 64 and is held generally centered and insulated from shell 64 by a jack insulator 66. Projecting from an outer wall of shell 64 is a pair of opposing bayonets 68.

About opening 44 of housing 12 is a plurality of fingers 72. Fingers 72 are electrically connected to housing 12 and thus to the shield conductor of cable 20 connected to second connection 16. When first connection 14 is connected to a mating connector, fingers 72 fit within an outer tubular shell such as shell 64 of third connection 18, and a pair of slots 74 of barrel 36 engages projections such as bayonets 68 of shell 64. Rotating barrel 36 brings a locking slot 76 corresponding to slot 74 into engagement with bayonets 68 and draws first connection 14 more securely into contact with the mating connector. Further rotation of barrel 36 moves a detent 78 (shown more clearly in FIG. 13) into engagement with bayonet 68. The bias of wave washer 58 against barrel 36 and barrel ledge 60 releasably holds bayonets 68 within detents 78. Removal of first connection 14 from the mating connector requires a reversal of the rotation of barrel so that bayonets 68 move from detents 78 and are aligned with slots 74.

Figure 15:
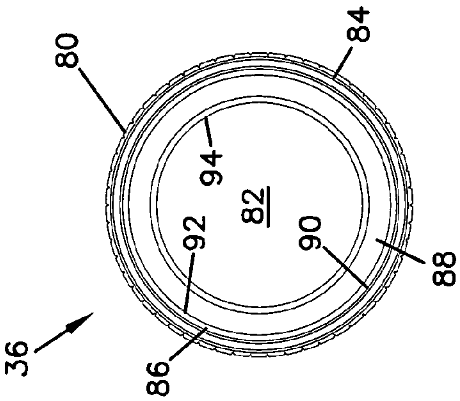
FIG. 15 is a second opposite end view of the locking barrel of FIG. 13.
Figure 14:
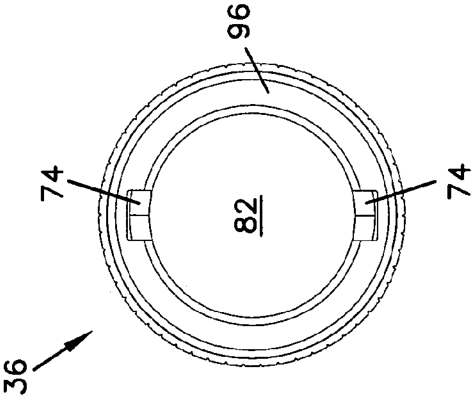
FIG. 14 is a first end view of the locking barrel of FIG. 13.
Figure 13:
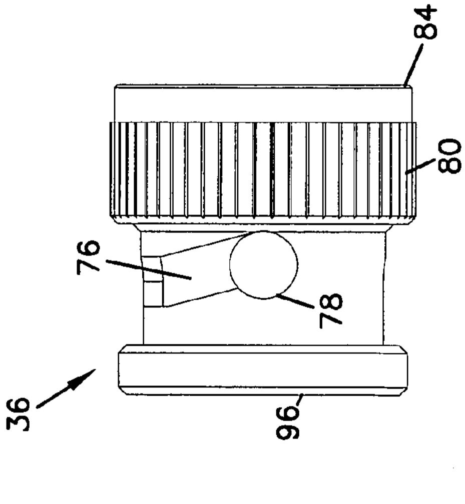
FIG. 13 is a side view of a locking barrel of the housing assembly of the coaxial cable splitter of FIG. 2.

Referring now to FIGS. 13 through 15, barrel 36 includes a textured or knurled ring 80 for improving friction and aiding in the movement of barrel 36. Barrel 36 includes a central opening 82 which defines three portions each with a different diameter with two ledges or shoulders extending radially therebetween. From a first end 84 which extends about housing 12, a first, largest diameter portion 90 is sized to fit over crimp washer 56 so that crimp washer 56 rests against a first shoulder 86. Large diameter portion 90 and crimp washer 56 are very close in diameter to permit barrel 36 to be crimped down onto crimp washer 56 to rotatable hold barrel 36 to housing 12. As shown in FIG. 6, wave washer 58 is captured between barrel ledge 60 and crimp washer 56. A second, middle diameter portion 92 is sized to fit over barrel ledge 60 of housing 12 and receives bearing washer 62. As shown in FIG. 6, bearing washer 62 is captured between a middle shoulder 88 and barrel ledge 60. Wave washer 58 biases crimp washer 56 away from barrel ledge 60, which in turn biases shoulder 88 against bearing washer 62 and bearing washer 62 against barrel ledge 60. The third, smallest diameter portion 94 extends through opening 82 to a second end 96. Smallest diameter portion 94 is sized to fit about fingers 72 and allow fingers 72 to be inserted within a mating jack connection.

Figure 18:
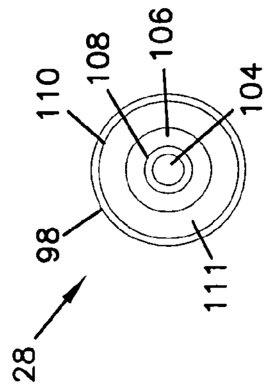
FIG. 18 is a second opposite end view of the plug end insulator of FIG. 16.
Figure 17:
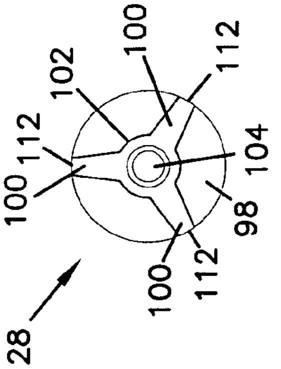
FIG. 17 is a first end view of the plug end insulator of FIG. 16.
Figure 16:
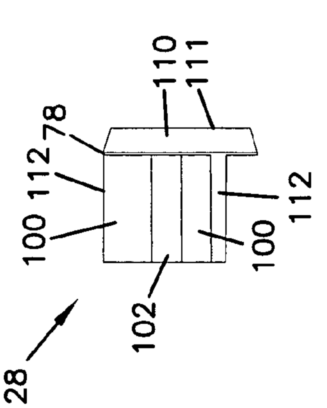
FIG. 16 is a side view of an insulator within the plug cable connection end of the housing assembly of FIG. 7.

Referring now to FIGS. 16 through 18, center conductor insulator 28 of first connection 14 includes a central channel 104 for receiving plug end 40 of center conductor 26. A disk 98 defines a diameter sized for insertion within opening 44 of housing 12 so that insulator 28 is held within opening 44 by an interference fit. Channel 104 extends through disk 98 and through a central shaft 102. A plurality of ribs 100 extend outward from shaft 102 to the same diameter as disk 98. The embodiment shown includes three ribs 102 but more or fewer ribs 102 are anticipated as within the scope of the present invention. Each rib 102 includes an outer surface 112 which cooperate to define generally the same diameter as disk 98. Disk 98 includes a taper 110 opposite ribs 102 and channel 104 includes an entry taper 108. Tapers 108 and 110 cooperate to aid in the insertion of insulator 28 about center conductor 26 and within opening 44. Taper 110 ends at a face 111 which defines a diameter greater than ledge 46 within opening 44.

Insulator 28 further includes a recess 106 about channel 104 and taper 108. Recess 106 receives a shoulder 114 of center conductor 26 (shown in FIGS. 19 through 21, below). Shoulder 114 and ledge 46 cooperate with recess 106 and face 111 to position insulator 28 within opening 44 and center conductor 26 within housing 12 and opening 32.

Figure 21:
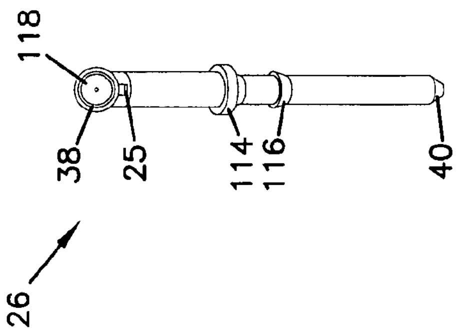
FIG. 21 is a second opposite end view of the center conductor of FIG. 19.
Figure 20:
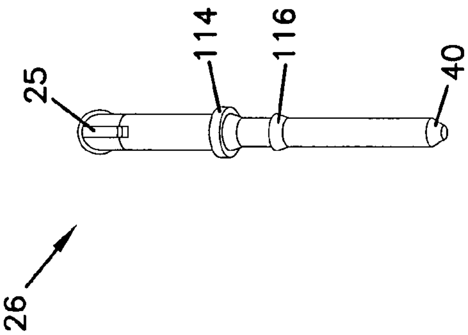
FIG. 20 is a first end view of the center conductor of FIG. 19.
Figure 19:
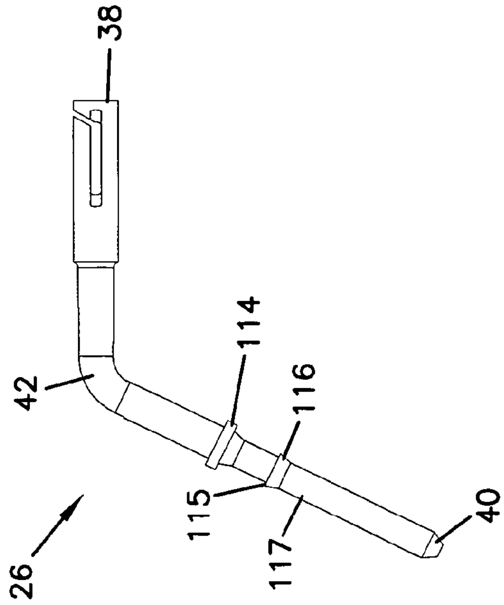
FIG. 19 is a side view of a center conductor of the housing assembly of FIG. 7.

Referring now to FIGS. 19 through 21, center conductor 26 includes shoulder 114 for positioning center conductor 26 within insulator 28. A catch 116 is located between shoulder 114 and plug end 40 along a shaft portion 117 of center conductor 26 in a location that is within channel 104 of insulator 28 when shoulder 114 engages recess 106. Catch 116 is sized larger than channel 104 and is tapered to ease insertion. On the opposite side of catch 116 from the taper is a wall 115 perpendicular to shaft portion 117. Insulator 28 is made of a resilient deformable material and will deform to permit entry of catch 118 within channel 104. Once center conductor 26 is positioned within channel 104, insulator 28 will conform to the shape of catch 116. Wall 115 cooperates with insulator 26 to resist extraction of center conductor 26 from insulator 28. At jack end 38 of center conductor 26 is an opening 118 for receiving a jack end of a center conductor of a mating connection. Angled portion 42 provides a transition between jack end 38 and plug end 40, which are angled with respect to each other. Opening 25 in center conductor 26 is positioned at least partially within angled portion 42. Opening 25 may be positioned at other locations along center conductor 26 as desired to facilitate connection of cable center conductor 24 to center conductor 26.

Figure 22:
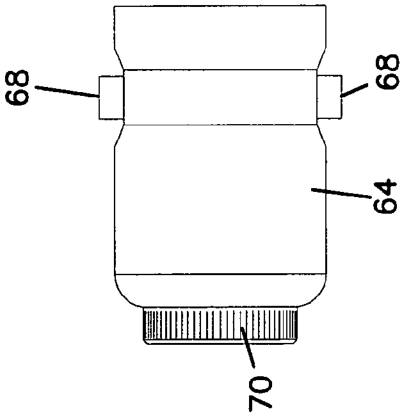
FIG. 22 is a side view of a tubular outer shell of the jack cable connection end of the housing assembly of FIG. 7.
Figure 23:
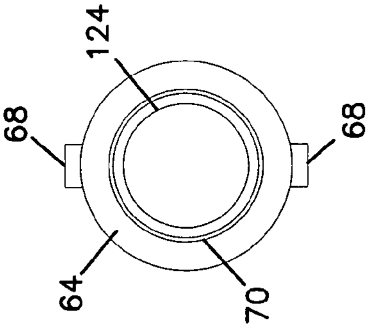
FIG. 23 is a first end view of the jack end outer shell of FIG. 22.
Figure 24:
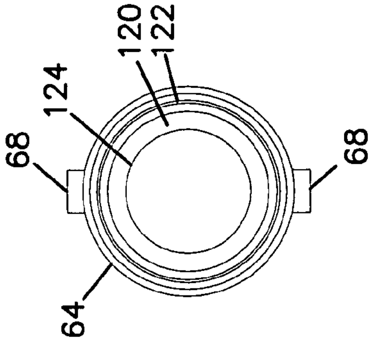
FIG. 24 is a second opposite end view of the jack end outer shell of FIG. 22.

Referring now to FIGS. 22 through 24, tubular shell 64 includes a smaller diameter opening defined by inner wall 124 within mating portion 70 and a larger diameter opening defined by inner wall 122 within shell 64. An insulator shelf or shoulder 120 extends between these two diameters. Shelf 120 provides a stop against which insulator 66 is positioned to set the depth of insertion of insulator 66 within shell 66. Center conductor 26 extends into shell 64 through the smaller diameter opening defined by inner wall 124, as shown in FIG. 6, above.

Figure 25:
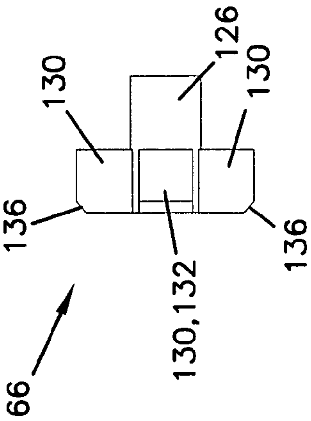
FIG. 25 is a side view of a jack end center conductor of the housing assembly of FIG. 7.
Figure 26:
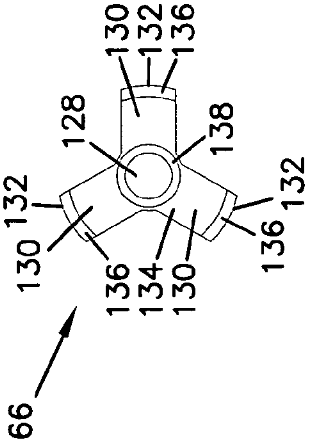
FIG. 26 is a first end view of the jack end center conductor of FIG. 25.
Figure 27:
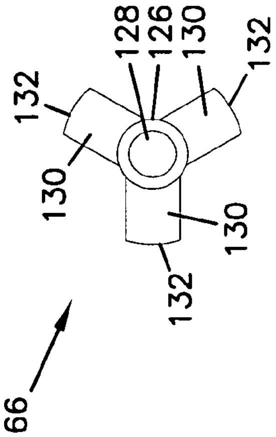
FIG. 27 is a second opposite end view of the jack end center conductor of FIG. 25.

Referring now to FIGS. 25 through 27, jack insulator 66 includes a center shaft 126 through which is defined a conductor channel 128 for receiving jack end 38 of center conductor 26. A plurality of ribs 130 extend from shaft 126 and each rib 130 defines an outer wall 132. The outer walls 132 of each rib 130 cooperate to engage inner wall 122 of shell 64 and position channel 128 generally centered within shell 64. Ribs 130 also cooperate to define a rear face 134 which engages shelf 120 within shell 64 to limit the depth of insertion of insulator 66 within shell 64. Each rib 130 also includes a tapered portion 136 to aid the insertion of insulator 66 within shell 64. Channel 128 includes a tapered entry 138 at rear face 134 to aid the insertion of center conductor 26 within channel 128.

Figure 28:
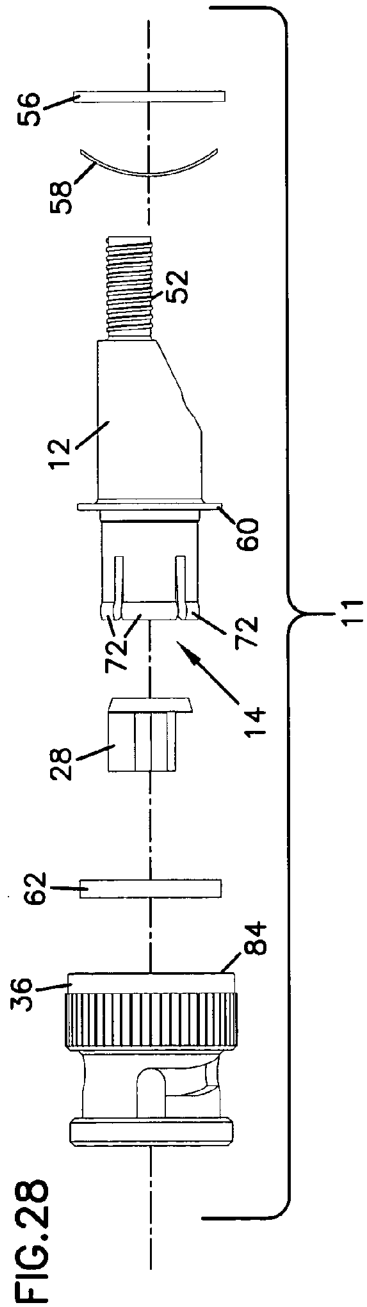
FIG. 28 is a side partially exploded view of the housing assembly of FIG. 7, showing the plug connection end components.
Figure 29:
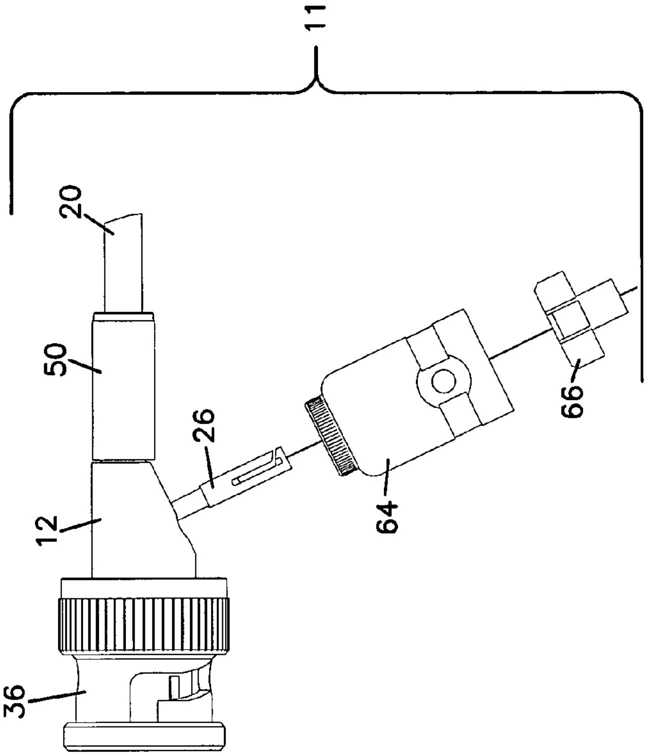
FIG. 29 is a side partially exploded view of the housing assembly of FIG. 7, showing the jack connection end components.

Referring now to FIGS. 28 and 29, the assembly of housing assembly 11 begins with the mounting of barrel 36 about fingers 72 of first cable connection 14. Plug insulator 28 is inserted into opening 44 of housing 12 and positioned against shoulder 46. Bearing washer 62 is inserted into barrel 36 through end 84 and positioned against shoulder 88. Barrel 36 is placed on housing 12 about fingers 72 so that bearing washer 62 is positioned against barrel ledge 60. Wave washer 58 is inserted over housing 12 into end 84 of barrel 36 and positioned against barrel ledge 60 opposite bearing washer 62. Crimp washer 56 is inserted over housing 36 into end 84 of barrel 36 and end 84 is compressed to capture crimp washer within barrel 36 and rotatably hold barrel 36 to housing 12. Center conductor 26 is inserted through opening 32 into central cavity 30 of housing 12 so that plug end 40 enters channel 104 of plug insulator 28. Center conductor 26 is advanced through channel 104 until shoulder 114 engages recess 106 of insulator 28. Jack end 38 of center conductor 26 extends through opening 32.

An outer jacket 21 of cable 20 is stripped so that cable center conductor 24 and inner insulation member 54 may be extended through opening 34 of crimp post 52 into central cavity 30. Cable center conductor 24 is inserted within opening 25 of center conductor 26 and mechanically and electrically connected to center conductor 26. The connection between cable center conductor 24 and center conductor 26 may be crimped and/or soldered. Outer shield conductor 19 of cable 20 is placed over crimp post 52 and crimp sleeve 50 is placed over outer shield conductor 19 and crimp post 52. Crimp sleeve 50 is compressed to mechanically and electrically connect outer shield conductor 19 to housing 12 and securely hold cable 20 to housing assembly 11.

Shell 64 is positioned so that mating portion 70 can be inserted into housing 12 through opening 32 and shell 64 is pressed into housing 12. Housing 12 is made from a conductive material and connecting shell 64 to housing 12 electrically connects shell 64 with the outer shield conductor of cable 20 and also to fingers 72 of first cable connection 14. Jack insulator 66 is positioned for insertion into shell 64 and center conductor 26 is positioned for jack end 38 to be received within channel 128. Jack insulator 64 is inserted into shell 64 until rear face 134 engages shelf 120 within shell 64.

Figure 31:
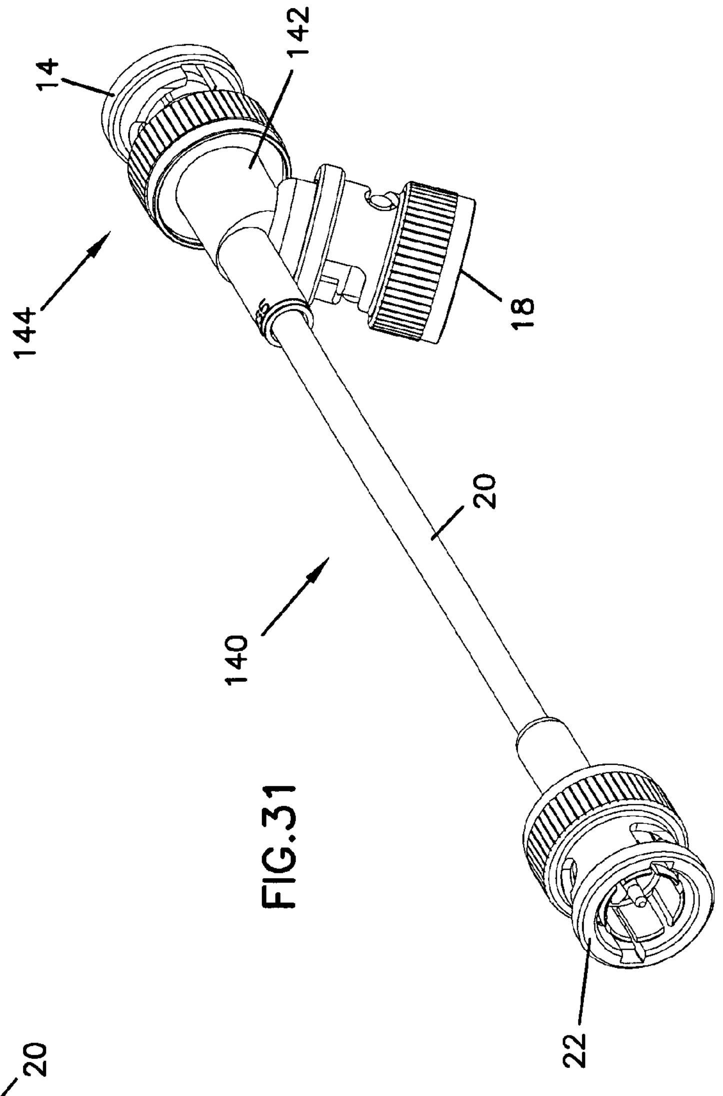
FIG. 31 is a second perspective view of the coaxial cable splitter of FIG. 30.
Figure 30:
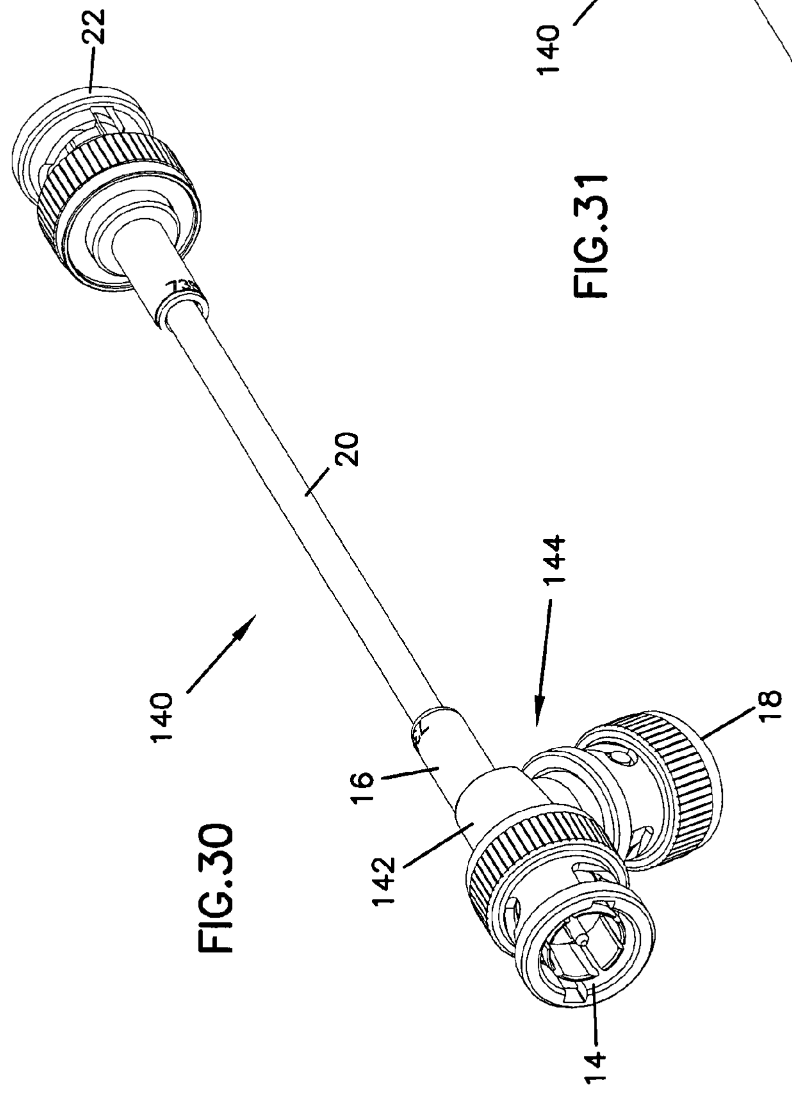
FIG. 30 is a first perspective view of an alternative embodiment of a coaxial cable splitter in accordance with the present invention, including three plug connection ends.

Referring now to FIGS. 30 and 31, an alternative embodiment 140 of a coaxial cable y-splitter according to the present invention is shown. Cable splitter 140 includes a housing assembly 144 with a housing 142 with first, second and third cable connections 14, 16 and 18, respectively, wherein third connection 18 is a plug BNC connector rather than a jack BNC connector.

Although the foregoing invention has been described in detail by way of illustration and example, for purposes of clarity of understanding, it will be obvious that changes and modifications may be practiced which are within the scope of the present invention as embodied in the claims appended hereto.

What is claimed is as follows:

1. A coaxial cable splitter comprising:

an integral body including a first cable connection, a second cable connection and a third cable connection, each cable connection defining an axis;

wherein the second cable connection is a crimp sleeve and the first cable connection is a coaxial connector, and the axes of the first and second cable connectors are arranged generally parallel to each other;

wherein the third cable connection is a coaxial cable connector and the axis of the third cable connection is arranged at an angle to the axes of the first and second cable connections;

wherein the first, second, and third cable connections each include a center conductor and the center conductors of the first, second, and third cable connections are electrically linked within the integral body; and wherein the first and third cable connections each include an outer shell positioned about the center conductor, the outer shell of the first cable connection electrically linked to the outer shell of the third cable connection.

2. The coaxial cable splitter of claim 1, wherein a cable is connected to the second cable connection and a coaxial cable connector is mounted at a distal end of the cable.

3. The coaxial cable splitter of claim 2, wherein the coaxial cable connector of the distal end of the cable is a BNC plug connector.

4. The coaxial cable splitter of claim 2, wherein the coaxial cable connector of the distal end of the cable is a BNC jack connector.

5. The coaxial cable splitter of claim 4, wherein the third cable connection is a BNC jack connector.

6. The coaxial cable splitter of claim 1, wherein a coaxial cable is connected to the second cable connection, the coaxial cable including a center conductor which is inserted through the crimp sleeve and electrically linked to the center conductors of the first and third cable connections.

7. The coaxial cable splitter of claim 6, wherein the crimp sleeve of the second cable connection is electrically connected to an outer coaxially arranged conductor of the coaxial cable and electrically linked to the outer shells of the first and third cable connections.

8. The coaxial cable splitter of claim 1, wherein the center conductors of the first and third cable connections form an integral center conductor having an angled shape, and wherein the center conductor of the second cable connection forms a center conductor of a jacketed cable.

9. A coaxial cable splitter comprising:

an integral body including a first cable connection, a second cable connection and a third cable connection, each cable connection defining an axis;

wherein the second cable connection is a crimp sleeve and the first cable connection is a coaxial connector, and the axes of the first and second cable connectors are arranged generally parallel to each other;

wherein the third cable connection is a coaxial cable connector and the axis of the third cable connection is arranged at an angle to the axes of the first and second cable connections;

wherein the first and third coaxial connections each include a center conductor and the center conductors of the first and third coaxial connections form an integral center conductor having an angled shape;

wherein the first and third coaxial connections each include an outer shell positioned about the center conductor, the outer shell of the first coaxial connection electrically linked to the outer shell of the third coaxial connection; and wherein the integral center conductor is held within the housing by at a pair of insulators which electrically isolate the center conductor from the housing.

10. The coaxial cable splitter of claim 9, wherein one of the pair of insulators is press-fit within the outer shell of the first coaxial connection.

11. The coaxial cable splitter of claim 10, wherein the integral center conductor is press-fit within the insulator within the first coaxial connector.

12. The coaxial cable splitter of claim 9, wherein one of the pair of insulators is press-fit within the outer shell of the third coaxial connection.

13. The coaxial cable splitter of claim 12, wherein the integral center conductor is press-fit with the insulator within the third coaxial connector.

14. The coaxial cable splitter of claim 9, wherein a center conductor of a coaxial cable forms a center conductor of the second coaxial connection and the cable center conductor is physically and electrically connected to the integral center conductor.

15. The coaxial cable splitter of claim 14, wherein the integral center conductor includes an angled portion and an opening to receive the cable center conductor.

16. The coaxial cable splitter of claim 15, wherein the connection of the cable center conductor and the integral center conductor is a crimped connection.

17. The coaxial cable splitter of claim 15, wherein the connection of the cable center conductor and the integral center conductor is a soldered connection.

* * * * *

UNITED STATES PATENT AND TRADEMARK OFFICE

CERTIFICATE OF CORRECTION

PATENT NO. : 7,094,971 B2
APPLICATION NO. : 10/770904
DATED : August 22, 2006
INVENTOR(S) : Johnsen It is certified that error appears in the above-identified patent and that said Letters Patent is hereby corrected as shown below:

Column 8, line 59, delete “at”.

Signed and Sealed this

Ninth Day of January, 2007

JON W. DUDAS
*Director of the United States Patent and Trademark Office*